Patented Feb. 25, 1936

2,031,651

UNITED STATES PATENT OFFICE 2,031,651

AZO DYES AND METHODS FOR THEIR PREPARATION

Emmet F. Hitch and Miles A. Dahlen, Wilmington, Del., and Martin E. Friedrich, Carneys Point, N. J., assignors to E. I. du Pont de Nemours & Company, Wilmington, Del., a corporation of Delaware No Drawing. Application July 27, 1933, Serial No. 682,464

16 Claims. (Cl. 260—95)

This invention relates to the preparation of new azo dyes and more particularly refers to the manufacture of water-insoluble azo dyes having the following general formula:

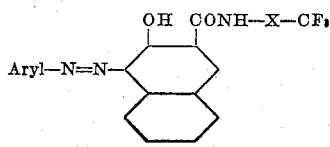

in which X represents an arylene nucleus.

It is an object of this invention to produce new azo pigments and dyes. A further object is to produce ice colors having good fastness to light and washing. Additional objects will become apparent from a consideration of the following description.

These objects are attained according to the herein described invention which in its preferred embodiment comprises coupling a diazotized arylamine of the benzene, diphenyl, naphthalene, diphenylamine, diphenylether, azo benzene, anthraquinone, or carbazole series, with a trifluormethyl-arylamide of 2-3-hydroxy-naphthoic acid, arylamides of the benzene series giving, in general, most satisfactory results. These compounds are chiefly of importance as ice colors, and when used for this purpose the aforementioned components should be free from water-solubilizing groups, such as carboxylic and sulfonic acid groups.

The invention may be more readily understood by a consideration of the following illustrative examples, in which the quantities are stated in parts by weight:

Example 1

40 parts of cotton piece goods well boiled and dried, were impregnated with the solution of the 2-3-hydroxy-naphthoyl derivative of 3-amino-benzotrifluoride, prepared in the following manner:

8 parts of the 3-trifluor-methyl-anilide of 2-3-hydroxy-naphthoic acid were pasted up with 10 parts of ethyl alcohol, and then 10 parts of caustic soda of 35° Bé. were added. When the arylamide had dissolved completely, sufficient water was added to bring the total volume up to 1600 parts.

The impregnated cloth was wrung out, and without drying, developed in a solution of the diazonium chloride from 2-5-dichloroaniline, prepared as follows:

16.5 parts of 2-5-dichloroaniline were dissolved in a mixture of 100 parts of hot water, and 58 parts of hydrochloric acid of 20° Bé. strength. 200 parts of ice were then added, followed by 8 parts of sodium nitrite (95%) dissolved in 30 parts of water. When the diazotization was finished the solution was filtered; and just before coupling, the mineral acidity of the filtrate was neutralized with 45 parts of sodium acetate.

The dyed cloth was rinsed, soaped at the boil, again rinsed and dried. An orange dyeing, having good fastness properties to light and washing was obtained. The dye has the probable formula:

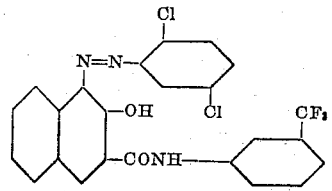

Example 2

Cotton goods were impregnated with the 3'-trifluor-methyl-anilide of 2-3-hydroxy-naphthoic acid, as described in Example 1. The developer solution was prepared as follows:

12 parts of ortho-dianisidine were dissolved in a mixture of 22 parts of sulfuric acid of 66° Bé. strength and 60 parts of hot water. The solution was poured onto an excess of ice, and the diazotization carried out with a solution of 7 parts of sodium nitrite dissolved in 15 parts of water. Just before coupling, the mineral acidity was neutralized with chalk, and the solution was made slightly alkaline with sodium bicarbonate.

The dyed cloth was rinsed, soaped at the boil, again rinsed, and dried. In this manner a bright navy blue dyeing, having good fastness to light and excellent fastness to chlorine was obtained. The formula of the dye is probably:

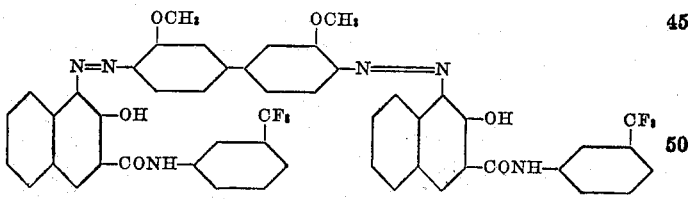

Example 3

The cloth was impregnated as in Example 1 and was developed in a solution prepared as follows:

10 parts of 4-nitro-2-amino-anisole were dissolved in a mixture of 15 parts of hydrochloric acid, (22 Bé. and 100 parts of boiling water.

The base was diazotized with a solution of 5 parts of sodium nitrite dissolved in 20 parts of water, with the addition of 160 parts of crushed ice for cooling. When the diazotization was finished, the solution was filtered; and just before coupling, 25 parts of sodium acetate were added to neutralize the mineral acidity.

The dyed cloth was rinsed, soaped at the boil, again rinsed, and dried. In this manner a bright red dyeing, having good fastness properties was obtained. The dye has the probable formula:

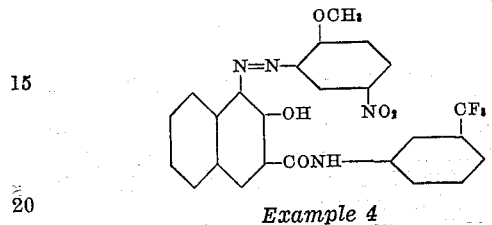

*Example 4*

42.6 parts of 4-chlor-2-amino-toluene were dissolved in 76 parts of hydrochloric acid (37%) and 100 parts of water. The solution was cooled to 0–5° C., by means of external cooling; and a solution of 21 parts of sodium nitrite dissolved in 50 parts of water was added. The temperature was held at 0–5° C., by the addition of about 100 parts of ice. The solution of the diazo salt was filtered, and run gradually into a mixture of 43 parts of piperidine-alpha-carboxylic acid, dissolved in 450 parts of water, at 5–10° C. The alkalinity of the solution to phenolphthalein papers was maintained by the addition of soda ash. When the coupling was finished, the solution was heated to 40° C., and filtered. Salt was then added until the diazoimino compound had precipitated. The oil was separated, dried in a vacuum at 65° C., and utilized in application processes, such as the following:

A printing paste was prepared according to the following formula:

| | Parts |
|---|---|
| A dry mixture of | 6.2 |
| 3.2 parts of the 2-3-hydroxy-naphthoyl derivative of m-amino-benzotrifluoride and | |
| 3.0 parts of the diazoimino compound obtained as above. | |
| Caustic soda (40° Bé.) | 3.0 |
| Starch tragacanth thickener | 65.0 |
| Water | 25.8 |
| | 100.0 |

Cotton piece goods were printed with the printing paste, then developed by subjecting to the action of live steam containing the vapors of acetic acid. In this manner the pattern was developed as a red dyeing, having good fastness properties. The new color has the probable formula:

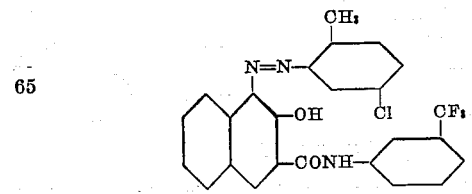

*Example 5*

2-5-dichloroaniline was diazotized, and converted to the sodium salt of the anti-diazotate by the method described in U. S. P. 531,975. The product was recrystallized from a small amount of hot water, and dried at 60–70° C. The material was then 80% pure (M. W. 213).

A printing paste was made up using the following materials:

| | Parts |
|---|---|
| 2-3-hydroxy-naphthoyl derivative of m-amino-benzotrifluoride | 3.2 |
| Dried anti-diazotate obtained as above | 2.7 |
| Caustic soda (40° Bé.) | 3.0 |
| Starch tragacanth thickener | 65.0 |
| Water | 26.1 |
| | 100.0 |

Cotton piece goods were printed with the paste, then developed in the usual manner in a chrome-acetic acid bath. In this manner an orange print was obtained, due to the production of the dye of the probable formula:

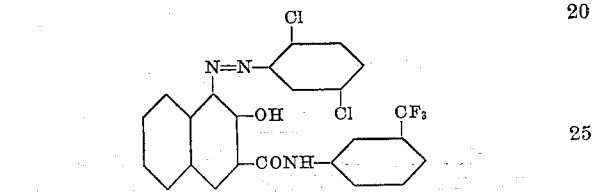

The following examples show the shades produced by coupling other diazotized arylamines commonly used as ice color bases, with a few of the trifluor-methyl-arylamides of 2-3-hydroxy-naphthoic acid suitable for use herein:

| 2-3-hydroxy-naphthoyl derivative of— | Base | Shade | Light | Chlorine |
|---|---|---|---|---|
| 3'-trifluoromethyl-aniline. | m-Chloroaniline | Scarlet | Very good | |
| Do | 5-nitro-2-aminoanisole | Bluish-red | Good | |
| Do | 3-nitro-4-aminotoluene | Red | Very good | |
| Do | 4-chlor-2-nitroaniline | Scarlet | Very good | |
| Do | 4-4'-diamino-diphenylamine | Blue | Good | |
| 4'-chlor-5'-trifluoro-methyl-aniline. | m-Chloroaniline | Orange | Fair | Fair |
| Do | 2-5-dichloroaniline | Orange | Fair | Fair |
| Do | 5-nitro-2-aminoanisole | Bluish-red | Poor | Good |
| Do | p-Chlor-o-nitraniline | Scarlet | Poor | Good |
| Do | p-p'-Diamino-diphenylamine | Navy blue | Very good | Good |
| Do | 1-amino-4-benzoylamino-2-5-diethoxy-benzene | Reddish-blue | Good | Fair |

It is to be understood that numerous arylamines, other than those disclosed above, may be diazotized and coupled according to the present invention. As previously mentioned arylamines of the benzene, diphenyl, naphthalene, diphenylamine, diphenyl-ether, azobenzene, anthraquinone or carbazole series are preferable, although the invention is by no means limited thereto. Likewise, these arylamines may have numerous well known groups substituted thereon. Where they are to be used in the production of ice colors it is imperative that they contain no water-solubilizing groups. However, with the exception of these water-solubilizing groups they may have one or more of the various well known substituents substituted thereon. Among these substituents mention may be made of the halogen, alkyl, alkoxyl, nitro, acylamino and trifluoro-methyl groups.

Many trifluoro-methyl-arylamides of 2-3-hydroxy-naphthoic acid may be used in place of those selected in the illustrative examples previously given. When selecting these arylamides it is advisable to choose arylamides of the benzene series. However, it is not intended to limit this invention to arylamides of the benzene series, since arylamides of the other commonly known aromatic series may likewise be used with good results. Among the arylamides which are suitable for use in this connection attention may be directed to the following:

*Arylamide of 2-3-hydroxy-naphthoic acid*

2'-Trifluoro-methyl-anilide
4'-Trifluoro-methyl-anilide
2'-Methyl-5'-trifluoro-methyl-anilide
2', 5'-Di-trifluoro-methyl-anilide
2'-Chloro-5'-trifluoro-methyl-anilide
2'-Trifluoro-methyl-4'-methoxy-anilide
2'-Trifluoro-methyl-4'-ethoxy-anilide
2' - Methoxy - 4' - trifluoro-methyl-5'-methoxy-anilide These arylamides may also have one or more non-water-solubilizing groups substituted thereon. Examples of a few of such substituents are halogen, alkyl and alkoxy groups. Where trifluor-methyl-arylamides are mentioned throughout the present specification and claims it is to be understood that this term includes the presence of more than one trifluor-methyl group on the arylamide nucleus. A method of making these substances is described in Patent No. 1,982,661, wherein are claimed the intermediates which are used herein in the manufacture of dyes.

The compounds forming the subject matter of this invention may be produced as pigments or dyes. When produced as dyes they may be utilized to impart color to textile materials according to various well known procedures. Among these dyeing processes mention may be made of the following:

(1) Textile material may be padded with the arylamides heretofore described, and then developed in diazo salt solutions prepared from arylamines selected according to the instructions previously given.

(2) The material may be padded with the arylamines and then printed with pastes containing diazo salts obtained from the arylamines.

(3) The arylamides may be mixed with anti-diazotates (nitrosamines) derived from the described arylamines. Textile fibers are then impregnated with pastes containing such mixtures and subjected to the action of weak acids.

(4) The arylamides may be mixed with water-soluble diazoimino compounds derived from the arylamines coming within the scope of this invention. Textile fibers are then printed with pastes containing such mixtures and subjected to the action of heat and weak acids resulting in the formation of the new dyes on the material.

The products described herein are valuable either as pigments or dyes. They impart to textile materials bright shades which are usually of excellent fastness to washing, light and chlorine. These shades are very attractive and are quite desirable from a commercial point of view.

As many apparently widely different embodiments of this invention may be made without departing from the spirit and scope thereof, it is to be understood that the invention is not limited to the specific embodiments thereof except as defined in the appended claims.

We claim:

1. A process for producing azo dyes which comprises coupling a diazotized arylamine with a trifluor-methyl-primary of 2-3-arylamide hydroxynaphthoic acid.

2. The process of claim 1 wherein the components are free from carboxylic and sulfonic acid groups.

3. A process for producing water-insoluble azo dyes which comprises coupling a diazotized arylamine selected from the group consisting of arylamines of the benzene, diphenyl, naphthalene, diphenylamine, diphenylether, azobenzene, anthraquinone and carbazole series, with a trifluor-methyl-anilide of 2-3-hydroxy-naphthoic acid.

4. A process for producing water-insoluble azo dyes which comprises coupling a diazotized arylamine selected from the group consisting of arylamines of the benzene and naphthalene series with a trifluor-methyl-anilide of 2-3-hydroxy-naphthoic acid.

5. Azo dyes having the following general formula:

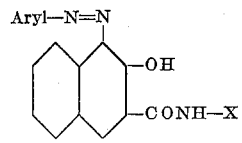

in which X represents the residue of a trifluor-methyl-anilide.

6. The dyes defined in claim 5 wherein the components designated as Aryl and X are free from sulfonic or carboxylic acid groups.

7. Water-insoluble azo dyes having the following general formula:

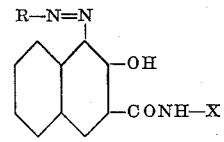

in which R represents the residue of an arylamine of the benzene, diphenyl, naphthalene, diphenylamine, diphenylether, azobenzene, anthraquinone or carbazole series, and X represents the residue of a trofluor-methyl-anilide.

8. Water-insoluble azo dyes having the following general formula:

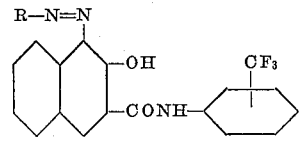

in which R represents the residue of an arylamine of the benzene or naphthalene series.

9. The method of making an azo dye which comprises coupling a diazotized aniline with one of a group of compounds consisting of a halogeno-, an alkyl-, and an alkoxy trifluoromethyl-anilide of 2,3-hydroxy-naphthoic acid.

10. A water-insoluble azo dye being the product of coupling a diazotized aniline with one of a group of compounds consisting of a halogeno-, an alkyl-, and an alkoxy trifluoromethyl-anilide of 2,3-hydroxy-naphthoic acid.

11. A process for producing azo dyes which comprises coupling a diazotized arylamine with a trifluor-methyl-anilide of 2,3-hydroxynaphthoic acid.

12. A process for producing azo dyes which comprises coupling a diazotized arylamine free from water-solubilizing substituents with a trifluor-methyl-anilide of 2,3-hydroxy-naphthoic acid free from water-solubilizing substituents.

13. A process for producing an azo dye which comprises coupling a diazotized arylamine with one of a group of compounds consisting of a halogeno-, an alkyl-, and an alkoxy trifluoromethyl arylamide of 2,3-hydroxy-naphthoic acid.

14. An azo dye described by the structural formula

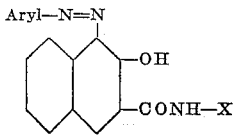

in which X represents the residue of a trifluoromethyl-arylamide.

15. The dyestuff defined in claim 14 in which the components designated Aryl and X are free from water-solubilizing substituents.

16. A water-soluble azo dye being the product of coupling a diazotized arylamine with one of a group of compounds consisting of an halogeno-, an alkyl-, and an alkoxy trifluoromethyl arylamide of 2,3-hydroxy-naphthoic acid.

EMMET F. HITCH.
MILES A. DAHLEN.
MARTIN E. FRIEDRICH.

CERTIFICATE OF CORRECTION.

Patent No. 2,031,651.　　　　　　　　　　　　　　　　February 25, 1936.

EMMET F. HITCH, ET AL.

It is hereby certified that error appears in the printed specification of the above numbered patent requiring correction as follows: Page 3, second column, strike out lines 1 to 4 inclusive, comprising claim 1, and insert instead the following:

1. A process for producing azo dyes which comprises coupling a diazotized arylamine with a trifluor-methyl primary arylamide of 2-3-hydroxy-naphthoic acid.

and that the said Letters Patent should be read with this correction therein that the same may conform to the record of the case in the Patent Office.

Signed and sealed this 5th day of May, A. D. 1936.

Leslie Frazer (Seal)　　　　　　　　　　　　　　　　　　Acting Commissioner of Patents.